(12) United States Patent
Dermody

(10) Patent No.: US 6,888,466 B2
(45) Date of Patent: May 3, 2005

(54) AIR FILTER TIMER

(76) Inventor: John Dermody, 250 Boxley La., Orange, VA (US) 22960

( * ) Notice: Subject to any disclaimer, the term of this patent is extended or adjusted under 35 U.S.C. 154(b) by 48 days.

(21) Appl. No.: 10/410,361

(22) Filed: Apr. 10, 2003

(65) Prior Publication Data

US 2004/0201485 A1 Oct. 14, 2004

(51) Int. Cl.$^7$ .............................................. G08B 21/00
(52) U.S. Cl. ....................................... 340/607; 210/138
(58) Field of Search ................................ 340/606, 607, 340/457; 210/107, 138, 139

(56) References Cited

U.S. PATENT DOCUMENTS

| | | | |
|---|---|---|---|
| 4,998,228 A | 3/1991 | Eger et al. ...................... 368/10 |
| 5,289,362 A | 2/1994 | Liebl et al. .................. 364/140 |
| 5,378,254 A | * | 1/1995 | Maly et al. .................... 96/418 |
| 5,914,453 A | * | 6/1999 | James et al. .................... 95/14 |
| 5,935,426 A | 8/1999 | Giordano et al. ............. 210/87 |
| 6,040,777 A | 3/2000 | Ammann et al. ........... 340/632 |
| 6,106,705 A | 8/2000 | Giordano et al. ............. 210/87 |
| 6,149,801 A | 11/2000 | Giordano et al. ............. 210/87 |
| 6,239,694 B1 | 5/2001 | Honda et al. ................ 340/457 |
| 6,284,129 B1 | 9/2001 | Giordano et al. ............. 210/87 |
| 6,355,177 B2 | 3/2002 | Senner et al. ............... 210/739 |
| 6,448,896 B1 | * | 9/2002 | Bankus et al. .............. 340/607 |
| 6,494,940 B1 | * | 12/2002 | Hak ............................ 96/224 |

FOREIGN PATENT DOCUMENTS

JP  02211261 A  8/1990  ............. B03C/3/28

* cited by examiner

Primary Examiner—Jeffery Hofsass
Assistant Examiner—Jennifer Stone
(74) Attorney, Agent, or Firm—Merek, Blackmon & Voorhees, LLC

(57) ABSTRACT

A novel air filter and timer for alerting persons responsible for changing or cleaning the air filter that it is time for servicing. An audible alarm is provided on the timer to emit a prolonged or intermittent audible alarm to indicate the need for servicing. The alarm can be incorporated into the filter or made separately and affixable to an air filter. The alarm sounds after a set time period to alert the user to change the filter.

20 Claims, 1 Drawing Sheet

AIR FILTER TIMER

BACKGROUND OF THE INVENTION

A. Field of the Invention

The present invention relates to a timer for an air filter.

B. Description of the Prior Art

The efficiency of air conditioning units and the quality of air emitted from an air conditioning unit is in great part determined by the ability of the system to filter the air through the blowers. Most air conditioning systems have air filters made of a paper, fiber or like materials. In general, these filters must be cleaned every month during peak use seasons to properly filter particles from the air. If they are not cleaned, then dust, mites, and other allergy causing materials will continue to be pumped through the closed air systems of houses, other dwellings and commercial buildings exacerbating the allergy conditions of the occupants. Additionally, the airborne particles can cause dust build up, discoloration and other similar undesirable pollution of the rooms serviced by the air conditioning units. The airflow blockage caused by the buildup of the particles on the filter can cause an increase in the strain on the air conditioner pump and an increase in the temperature in the air conditioning unit, thereby decreasing the effective life of the unit.

The present invention proposes a novel air filter and timer for alerting those persons responsible for changing or cleaning the air filter that it is time for servicing to provide a cleaner environment and to increase the life of the air conditioning or air cleaning unit. An audible alarm is preferably provided on the timer to emit a prolonged or intermittent audible alarm to indicate the need for servicing.

None of the above inventions and patents, taken either singly or in combination, is seen to describe the instant invention as claimed.

SUMMARY OF THE INVENTION

The present invention is accomplished by preferably incorporating or affixing a timer to an air filter. The timer is preferably of such simple design as to have a start button, a timing unit, and a speaker for emitting a warning sound when it is time to change or service the filter.

Accordingly, it is a principal object of the invention to provide an air filter timer with an alarm for signaling the need to service or change the air filter.

It is another object of the invention to provide an air filter timer having an audible alarm for broadcasting an alert that the filter needs to be serviced.

It is a further object of the invention to provide an alarm that can be attached to an air filter to signal the end of the service life of an air filter.

Still another object of the invention is to provide an audible alarm on an air filter that emits a continuous or intermittent alarm until the servicing of an air filter has been accomplished and the alarm is reset or turned off.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings. The present invention

DETAILED DESCRIPTION OF THE PREFERRED EMBODIMENT(S)

The present invention is to an alarm for an air filter.

It is helpful to the overall efficient operation of an air conditioner and its ability to pump clean air into a house or other building that the air filter be changed at the recommended intervals, and especially during the summer months when the demands on the air conditioning systems are highest. However, it is more likely, especially in residential households, that the air filters are completely overlooked until the system is operating so inefficiently as to not be able to keep up with demand, or allergy sufferers are reminded that airborne pollutants can be reduced by proper maintenance of the air filters. Additionally the decreased air flow caused by the blockage significantly strains the air flow system and increases the operating temperature of the air pump or blower motor decreasing the expected life of the air conditioning unit.

It is therefore desirable to produce a low cost reminder system for changing the air filters of an air conditioning system. One such method and apparatus for accomplishing this goal is described herein and is best explained with reference to the accompanying drawings.

Figure 1:
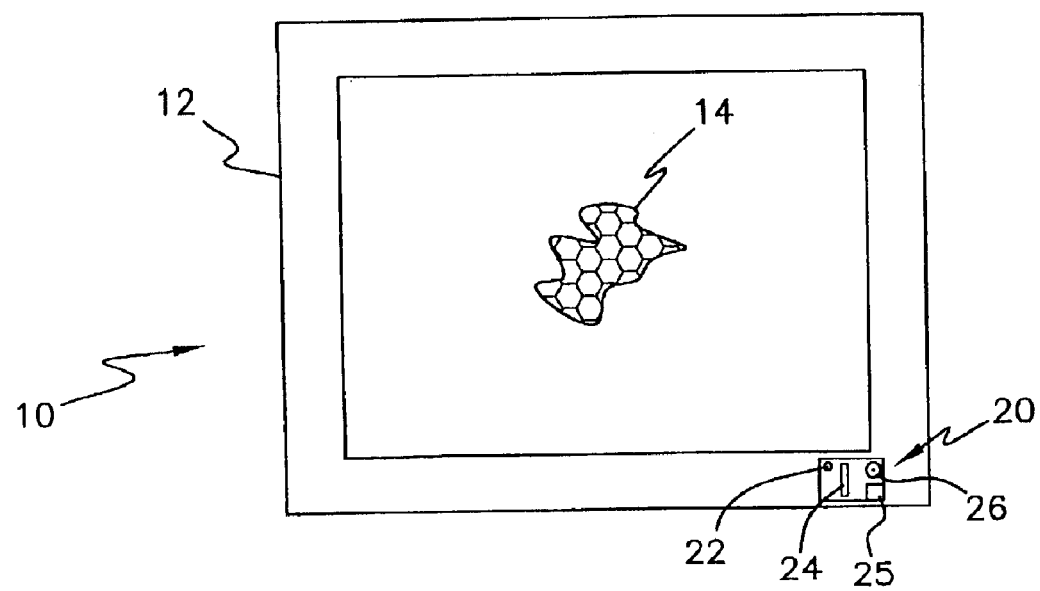
FIG. 1 is an environmental perspective of an air filter with an alarm according to the present invention.

FIG. 1 shows a air conditioning filter 10 incorporating a timer according to the present invention. The filter 10 has a cardboard or similar stiff border 12 with a paper, fiber or similar filter media 14 construction as is well known in the prior art. The purpose of the border is to locate the filter in the proper position and maintain the filter in a taut position over the opening in the air conditioning system (not shown).

In the preferred embodiment, the timer is incorporated into one corner of the stiff border 12 of the air conditioning filter. As shown in the figure, the timer 20 consists in its simplest form of a start button 22, a timing circuit 24 (and appropriate timing circuit power source 25) and a speaker 26. When the filter 10 is ready to be inserted into an air conditioning unit, the installer presses the start button 22 which activates the timing circuit 24. While the timing circuit may be set for any time period according to the expected life of the associated filter 10, preferably the timing circuit is set for a default 31 days, the average service life expectancy of a household air filter.

At the end of the timing circuit countdown, the timing circuit activates speaker 26 to give an audible alert that the filter needs to be serviced or changed. The alert may be a continuous alarm, but is preferably an intermittent audible signal analogous to that provided by a smoke alarm low battery level alert. The intermittent alert allows for an extended life of the power source compared to the constant signal, and provides for a more gentle alert to the user than a constant sounding alarm.

Figure 2:
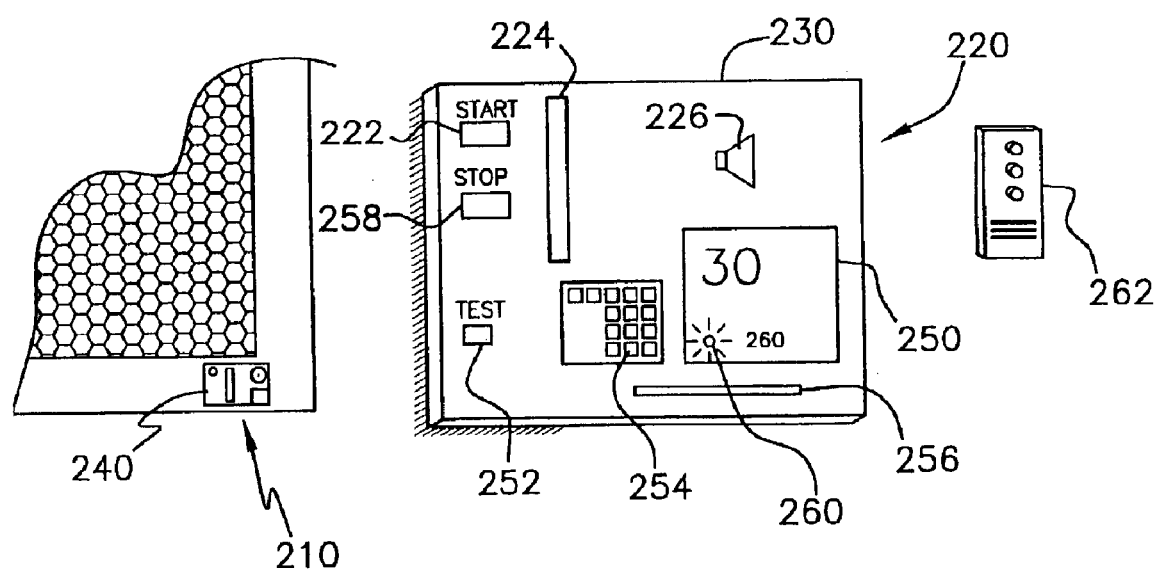
FIG. 2 is an exploded view of the air filter and the timer according to the present invention.

FIG. 2 shows an alternate embodiment to the preferred embodiment in the form of an "add on" timer with additional optional features. The alarm 220 is formed separately from the air filter and has a body 230 for retaining the start button 222, the timing circuit 224 and the speaker 226. The body of the alarm is provided with adhesive, VELCRO, or other attachment means for mounting the filter alarm to the air filter 210. Preferably the user will cut a hole out of the filter (as shown at 240) and insert the timer 220 in the filter 210 using the adhesive on the front of the filter body 230 to attach the timer to the filter. This method of attachment reduces the likelihood of interference of the timer with the insertion of the filter into the air conditioning system (not shown) by lowering the profile of the combined air filter and timer.

FIG. 2 also shows several optional features which one skilled in the art would recognize could be incorporated into either embodiment of the timer. A display 250 is provided to show the number of days that the filter has been in operation since the start button 222 was activated, or more preferably the number of days remaining until the service alarm will activate.

A test button 252 can also be provided to either provide an audible test of the power source and timer circuit to provide an audible response to the test through speaker 226 to indicate that the timer is operating in a proper manner. Additionally, the test button can be used to cause a normally inactive display 250 to display the remain time or a test result indication such as "ok" or power level indication.

A group of set buttons 254 can be used in conjunction with the display 252 to change or to set the service life for the timing circuit 224. By raising or lowering the service life entered into the timing circuit, the number of days from the time the start button is pressed until the alarm sounds can be changed so that the timer 220 can be used on different filters with varied service lives.

A sensor 256 can be incorporated into the filter to control the timer. Since the actual service life of the filter can be affected by other variables such as actual time of air conditioner blower operation, rate of air through the filter, amount of impurities in the air, etc., a sensor 256 can be used to sense the condition of the air, the air flow, or the state of operation of the air conditioner or other system being filtered.

A stop button 258 can be provided to end the timing circuit or to silence the audible alarm once the alert begins to sound after elapse of the service time period counted by the timing circuit. The stop button feature however is preferably incorporated into the start button as well.

A status indicator light 260 can also be provided to indicate the status of the timing system. Once the start button 222 has been pressed, the indicator light can be moved to a strobe condition, light periodically to show that the timing circuit has been initiated, while conserving the amount of power necessary to operate the light. The period between strobes can be varied to speed up as the end of the service life approaches for a quick visual indication of the life remaining on the filter. The light could also be changed to a constant on or off position as an indication that the filter needs to be changed. This could also be used as an alternative to the audible alert.

Additionally, the filter alarm can broadcast the alarm to a remote location such as a pager, e-mail system, or remote indicator 262 for the convenience of the user without varying from the scope of the invention.

It is to be understood that the present invention is not limited to the sole embodiment described above, but encompasses any and all embodiments within the scope of the following claims.

I claim:

1. An air filter for mounting in an air treatment system comprising:
   an air filter consisting substantially of a filtering media and a substantially rigid filter media border connected to and retaining said filtering media in a taut position;
   a timer mounted to said air filter for counting between a start position and an alarm position;
   said timer having an alarm activated when the timer reaches said alarm position.

2. The air filter alarm system according to claim 1, wherein said alarm is an audible alarm.

3. The air filter alarm system according to claim 1, wherein said timer is a count down filter, and said timer start position is preselected to be substantially the number of days between recommended servicings of said air filter.

4. The air filter alarm system according to claim 1, wherein said timer is affixed to said filter media border.

5. The air filter alarm system according to claim 1, wherein said timer is activated by depressing a start button on said timer.

6. The air filter alarm system according to claim 1, wherein said air filter is incorporated into an air conditioning system.

7. An air filter alarm system for an air conditioning system having an air conditioning housing, comprising:
   an air filter consisting substantially of a timer, a filtering media and a filter media border;
   a timer affixed to said filter media border and having an alarm and a timing circuit;
   said alarm having an off position and an on position;
   said timer timing circuit for timing a preselected time period;
   said timer moving said alarm from said off position to said on position after the elapse of said preselected time period;
   said alarm emitting an alert signal when said alarm is in said on position.

8. An air filter according to claim 7, wherein said preselected time period is substantially the cleaning cycle of said air filter.

9. An air filter according to claim 7, further including a starter for initiating said timing circuit.

10. An air filter according to claim 7, wherein said timer further includes a display for displaying the amount time until the elapse of said preselected time period.

11. An air filter according to claim 7, wherein said timer further includes means for inputting said preselected timer period into said timing circuit.

12. An air filter according to claim 7, wherein said timer further includes a key pad for inputting said preselected timer period into said timing circuit.

13. An air filter according to claim 7, wherein said alarm emits an audible signal when said alarm is in said on position.

14. An air filter according to claim 7, wherein said timer includes a reset button for moving said alarm from said on position to said off position.

15. An air conditioning system
   an air conditioning system housing,
   an air filter having a filtering media and a fibrous filter media border, and removably housed within said air conditioning system housing,
   a timer mounted to the air filter border and having an alarm and a timing circuit;
   said alarm having an off position and an on position;
   said timer timing circuit for timing a preselected time period;
   said timer moving said alarm from said off position to said on position after the elapse of said preselected time period on said timing circuit;
   said alarm emitting an alert signal when said alarm is in said on position.

16. An air filter according to claim 15, wherein said preselected time period is substantially the cleaning cycle of said air filter.

17. An air filter according to claim 15, further including a start button for initiating said timing circuit and a reset button for selectively moving said alarm from said on position to said off position.

18. An air filter according to claim 15, wherein said timer further includes a display for displaying the amount time until the elapse of said preselected time period.

19. An air filter according to claim 15, wherein said timer is replaced with each filter replacement.

20. An air filter according to claim 7, wherein said alarm includes a speaker and said alert signal is an audible alarm signal.

* * * * *